(12) United States Patent
Sode

(10) Patent No.: US 8,205,184 B2
(45) Date of Patent: Jun. 19, 2012

(54) METHOD AND APPARATUS FOR LAYING OUT POWER WIRING OF SEMICONDUCTOR DEVICE

(75) Inventor: Mikiko Sode, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/071,076

(22) Filed: Mar. 24, 2011

(65) Prior Publication Data

US 2011/0239174 A1    Sep. 29, 2011

(30) Foreign Application Priority Data

Mar. 26, 2010   (JP) .................................. 2010-071789

(51) Int. Cl.
  G06F 17/50    (2006.01)
  G06F 9/455    (2006.01)
(52) U.S. Cl. ......................... 716/127; 716/126; 716/132
(58) Field of Classification Search .................. 716/126, 716/127, 132
  See application file for complete search history.

(56) References Cited

U.S. PATENT DOCUMENTS

| | | | | |
|---|---|---|---|---|
| 6,208,950 | B1 * | 3/2001 | Chiba ............................ | 702/191 |
| 6,405,346 | B1 * | 6/2002 | Nawa ............................. | 716/115 |
| 7,346,869 | B2 * | 3/2008 | Tai et al. ........................ | 716/120 |
| 7,353,490 | B2 * | 4/2008 | Jiang et al. .................... | 716/109 |
| 7,603,641 | B2 * | 10/2009 | Lin ................................ | 716/120 |
| 2007/0220474 | A1 * | 9/2007 | Chang et al. .................... | 716/15 |
| 2008/0104554 | A1 * | 5/2008 | Kobayashi et al. ................ | 716/4 |
| 2009/0282378 | A1 | 11/2009 | Tanaka | |
| 2011/0239174 | A1 * | 9/2011 | Sode ............................. | 716/109 |

FOREIGN PATENT DOCUMENTS

| | | |
|---|---|---|
| JP | 2006-172488 | 6/2006 |
| JP | 2009-276822 | 11/2009 |

OTHER PUBLICATIONS

D.K. Su, M. J. Loinaz, S. Masui and B. A. Wooley, "Experimantal Results and Modeling Techniques for Substrate Noise in Mixed-Signal Integrated Circuits,"IEEE Journal of Solid-State Circuits, vol. 28, No. 4, pp. 420-430, Apr. 1993.

J. Singh, and S. S. Sapatnekar, "Partition-Based Algorithm for Power Grid Design Using Locality," IEEE Transactions on Computer-aided Deign of Integrated Circuits and Systems, vol. 25, No. 4, pp. 664-677, Apr. 2006.

* cited by examiner

Primary Examiner — Suresh Memula
(74) Attorney, Agent, or Firm — Young & Thompson

(57) ABSTRACT

A method for laying out a power wiring of a semiconductor device including an analog circuit and a digital circuit includes: modeling the power wiring as an analysis model including a plurality of nodes and a plurality of element resistors provided between the plurality of nodes neighboring each other; obtaining voltage values of the plurality of nodes by a circuit simulation; searching a maximum current node from nodes of the digital circuit when a substrate noise violation exists in a voltage value of a node of the analog circuit, the maximum current node having a maximum amount of current flowing into the node of the analog circuit; searching a path of a current flowing into the maximum current node in the digital circuit; selecting a bottleneck element resistor from among the plurality of element resistors included in the path; and changing a resistance value of the bottleneck element resistor.

9 Claims, 9 Drawing Sheets

METHOD AND APPARATUS FOR LAYING OUT POWER WIRING OF SEMICONDUCTOR DEVICE

CROSS-REFERENCE TO RELATED APPLICATIONS

This application is based upon and claims the benefit of priority from Japanese patent application No. 2010-071789, filed on Mar. 26, 2010, the disclosure of which is incorporated herein in its entirety by reference.

BACKGROUND

The present invention relates to a method and an apparatus for laying out a power wiring of a semiconductor device.

In digital circuits on which a number of logic circuits are mounted, power-supply noise occurs due to switching operation of logic circuits. In particular, in analog-digital-mixed LSIs on which analog circuits and digital circuits are mounted together on a single substrate, the power-supply noise due to digital circuits reaches analog circuits through the substrate, which causes a malfunction of analog circuits. Such power-supply noise transmitted through the substrate is particularly called substrate noise.

Therefore, it is important to reduce the substrate noise in the circuit design. By simply increasing the distance between an analog circuit and a digital circuit, the substrate noise is reduced. However, the size of an LSI becomes larger. Thus, a guard ring is provided around the analog circuit, for example. Su et al. ("Experimental Results and Modeling Techniques for Substrate Noise in Mixed-Signal Integrated Circuits," IEEE Journal of Solid-State Circuits, vol. 28, no. 4, pp. 420-430, Apr. 1993.) discloses a circuit simulation method for an analog-digital-mixed LSI having guard rings. However, the chip area and manufacturing processes are increased by providing guard rings.

Further, the substrate noise can also be reduced by providing decoupling capacitors to the digital circuit. Japanese Unexamined Patent Application Publication No. 2006-172488 discloses a circuit design method for providing decoupling capacitors effectively. However, the chip area and the power consumption due to leak current are increased by providing decoupling capacitors.

On the other hand, the substrate noise can be considered as a dynamic IR drop problem because the substrate noise is caused due to variations in power voltage. Thus, as in the case of solving the dynamic IR drop problem, the substrate noise can also be reduced by widening the power wiring of the digital circuit. Singh et al. ("Partition-Based Algorithm for Power Grid Design Using Locality," IEEE Transactions on Computer-aided Design of Integrated Circuits and Systems, vol. 25, no. 4, pp. 664-677, Apr. 2006.) discloses a method for resolving the IR drop violation by widening the whole wiring in a certain region when the IR drop violation exists.

Note that Japanese Unexamined Patent Application Publication No. 2009-276822 discloses a design support method of a semiconductor device for facilitating the analysis of the substrate noise which was invented by the present inventor.

SUMMARY

The present inventor has found a problem shown below. The increase in width of the wiring to resolve the substrate noise should be minimized because the area of the power wiring increases and semiconductor integrated circuits become larger. However, in the method disclosed by Singh et al., semiconductor integrated circuits tend to become larger due to widening the whole wiring.

A first aspect of the present invention is a method for laying out a power wiring of a semiconductor device including an analog circuit and a digital circuit. The method includes: modeling the power wiring as an analysis model including a plurality of nodes and a plurality of element resistors provided between the plurality of nodes neighboring each other; obtaining voltage values of the plurality of nodes by a circuit simulation; searching a maximum current node from nodes of the digital circuit when a substrate noise violation exists in a voltage value of a node of the analog circuit, the maximum current node having a maximum amount of current flowing into the node of the analog circuit; searching a path of a current flowing into the maximum current node in the digital circuit; selecting a bottleneck element resistor from among the plurality of element resistors included in the path; and changing a resistance value of the bottleneck element resistor.

A second aspect of the present invention is an apparatus for laying out a power wiring of a semiconductor device including an analog circuit and a digital circuit. The apparatus includes: a power wiring modeling unit that models the power wiring as an analysis model including a plurality of nodes and a plurality of element resistors provided between the plurality of nodes neighboring each other; a substrate noise determination unit that obtains voltage values of the plurality of nodes and determines whether a substrate noise violation exists or not in a voltage value of a node of the analog circuit; and a bottleneck determination unit that searches, from nodes of the digital circuit, a maximum current node having a maximum amount of current flowing into the node of the analog circuit, determines a bottleneck element resistor from the plurality of element resistors included in a path of a current flowing into the maximum current node, and changes a resistance value of the bottleneck element resistor.

In the present invention, the maximum current node having a maximum amount of current flowing into the node of the analog circuit is searched from nodes of the digital circuit; a path of a current flowing into the maximum current node is searched in the digital circuit; a bottleneck element resistor is selected from among the element resistors included in the path of the current flowing into the maximum current node; and a resistance value of the bottleneck element resistor is changed. Therefore, the substrate noise violation can be resolved and an increase in size of semiconductor integrated circuits can be prevented.

According to aspects of the present invention, it is possible to provide a method and an apparatus for laying out a power wiring of a semiconductor device capable of resolving the substrate noise violation and preventing an increase in size of the semiconductor device.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Exemplary embodiments of the present invention will be described in detail below with reference to the accompanying drawings. Note that the present invention is not limited to embodiments described below. The following description and the accompanying drawings are appropriately simplified to clarify the explanation.

First Embodiment

Figure 1:
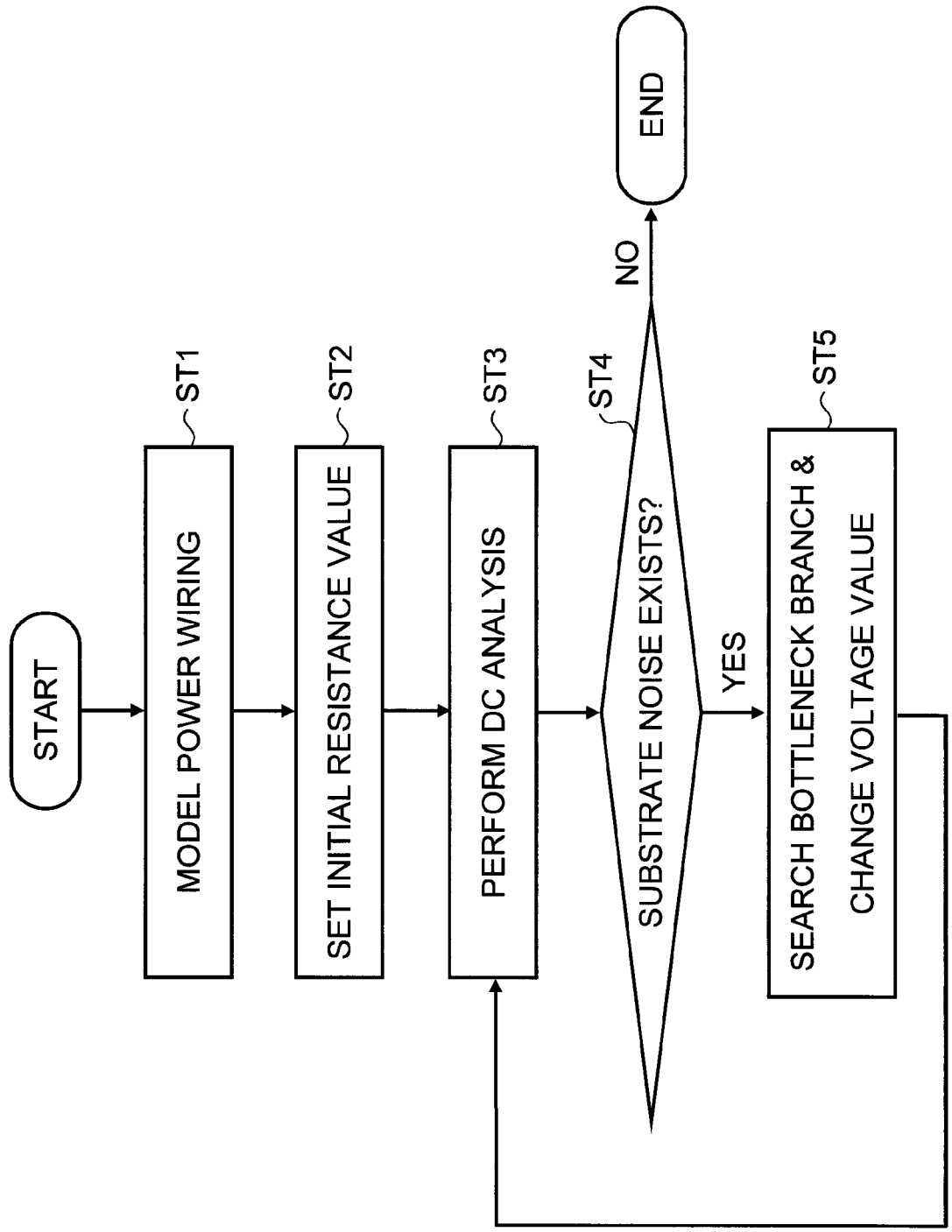
FIG. 1 is a flowchart showing a method for laying out a power wiring of a semiconductor device according to a first embodiment of the present invention.

A method for laying out a power wiring of a semiconductor device according to a first embodiment of the present invention is described hereinafter with reference to FIG. 1. FIG. 1 is a flowchart showing the method for laying out a power wiring of a semiconductor device according to the first embodiment of the present invention. As shown in FIG. 1, the method for laying out a power wiring has five steps: step ST1 of modeling a power wiring, step ST2 of setting an initial resistance value, step ST3 of performing a DC analysis, step ST4 of determining whether substrate noise violation exists or not, and step ST5 of searching a bottleneck branch and changing the resistance value of the bottleneck branch when the substrate noise violation exists.

Figure 2A:
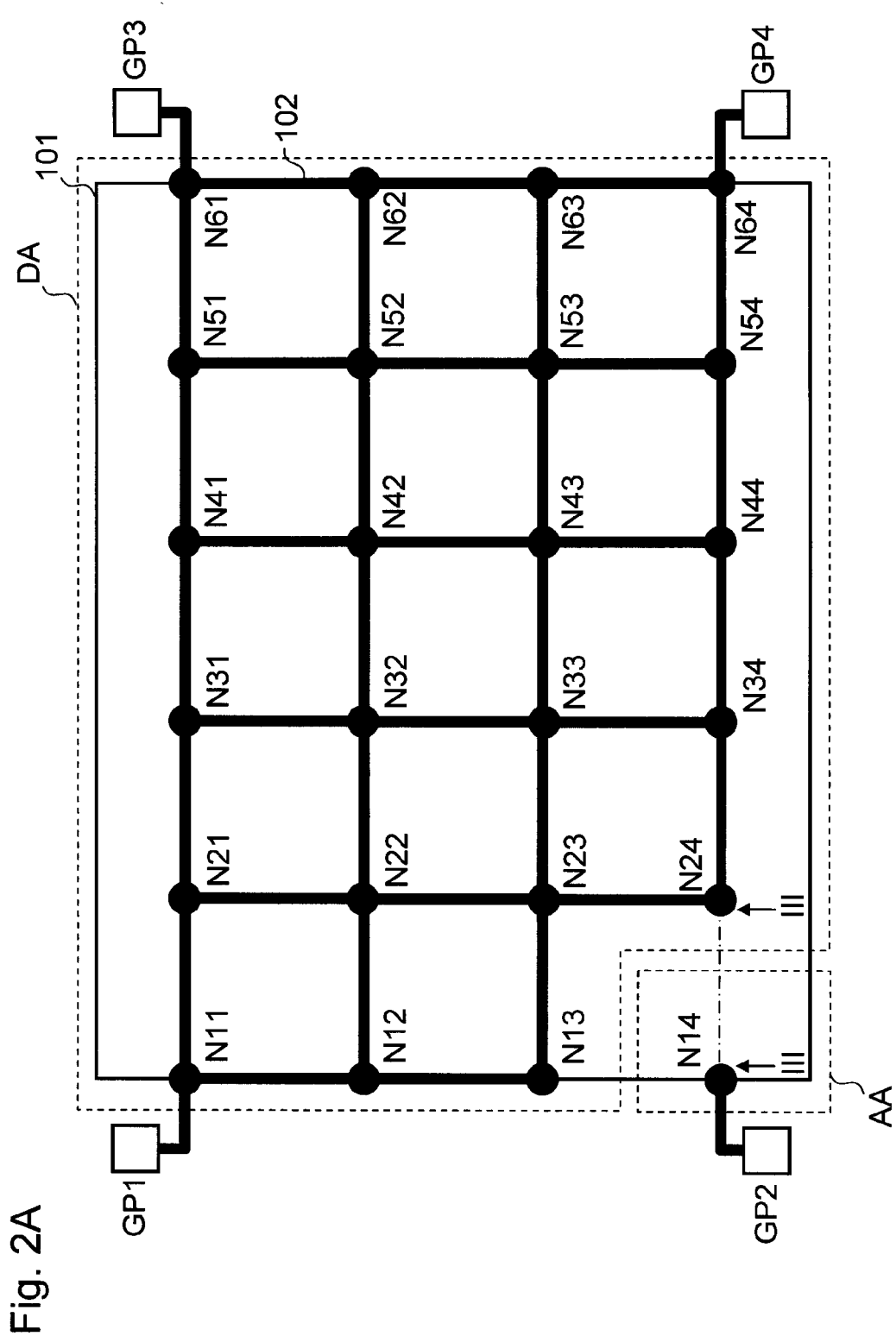
FIG. 2A is a plan view showing a ground wiring network layout of a semiconductor device chip 101.

First, step ST1 of modeling a power wiring is described. The power wiring according to the first embodiment is a ground wiring. FIG. 2A is a plan view showing a ground wiring network layout of a semiconductor device chip 101 which is an analog-digital-mixed LSI (Large Scale Integration). A ground wiring network to be modeled is described hereinafter with reference to FIG. 2A. As shown in FIG. 2A, the semiconductor device chip 101 has an analog circuit region AA and a digital circuit region DA. The digital circuit region DA has a power wiring network 102 indicated by a bold line.

The ground wiring network 102 is a net-like wiring having four rows in the vertical direction of FIG. 2A and six columns in the horizontal direction of FIG. 2A. Further, the ground wiring network 102 has a total of 24 (=3+4×5) nodes at intersections of wirings in the horizontal direction and wirings in the vertical direction.

Specifically, in the leftmost column of the wiring of FIG. 2A, three nodes N11 to N13 align. In the column located on the immediate right of this column of the wiring, four nodes N21 to N24 align. In the column located on the immediate right of this column of the wiring, four nodes N31 to N34 align. In the column located on the immediate right of this column of the wiring, four nodes N41 to N44 align. In the column located on the immediate right of this column of the wiring, four nodes N51 to N54 align. Then, in the column located on the immediate right of this column of the wiring, or in the rightmost column of the wiring of FIG. 2A, four nodes N61 to N64 align.

In other words, in the uppermost row of the wiring of FIG. 2A, six nodes N11, N21, N31, N41, N51, and N61 align. In the row located immediate below this row of the wiring, six nodes N12, N22, N32, N42, N52, and N62 align. In the row located immediate below this row of the wiring, six nodes N13, N23, N33, N43, N53, and N63 align. Further, in the row located immediate below this row of the wiring, or in the lowermost row of the wiring of FIG. 2A, five nodes N24, N34, N44, N54, and N64 align.

Among the 23 nodes, three nodes N11, N61, and N64 located at three corners are connected to ground pads GP1, GP3, and GP4, respectively, through wirings.

On the other hand, in the analog circuit region AA, one node N14 is provided. The node N14 is connected to a ground pad GP2 through a wiring. In this manner, the ground wiring of the analog circuit is provided separately from the ground wiring network 102 of the digital circuit.

Figure 2B:
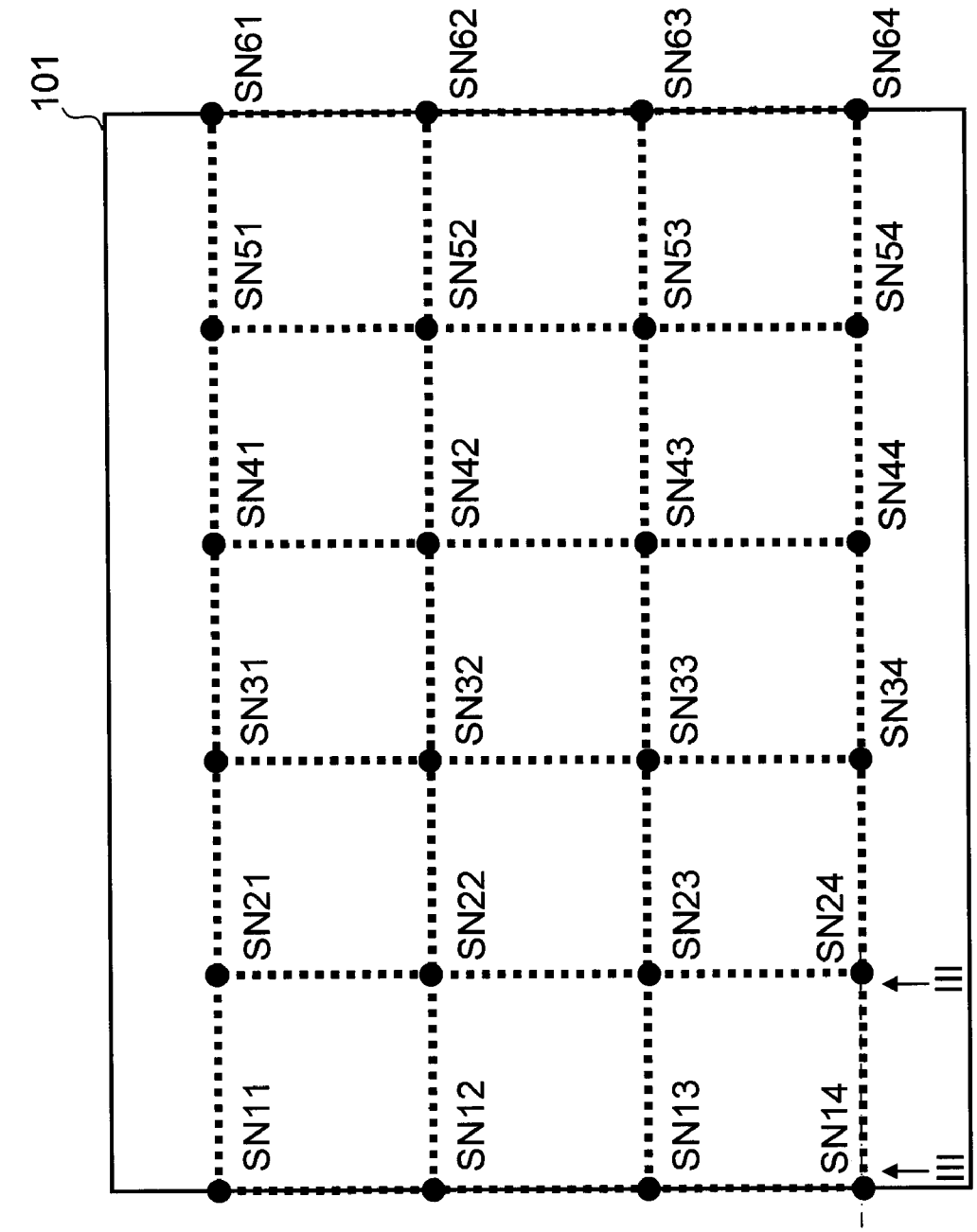
FIG. 2B is a plan view showing a virtual wiring network layout in a substrate of the semiconductor device chip 101.

FIG. 2B is a plan view showing a virtual wiring network layout in a substrate of the semiconductor device chip 101 and corresponding to the ground wiring network layout shown in FIG. 2A. Twenty-four virtual nodes (virtual nodes SN11 to SN14, virtual nodes SN21 to SN24, virtual nodes SN31 to SN34, virtual nodes SN41 to SN44, virtual nodes SN51 to SN54, and virtual nodes SN61 to SN64) corresponding to 24 nodes (nodes N11 to N14, nodes N21 to N24, nodes N31 to N34, nodes N41 to N44, nodes N51 to N54, and nodes N61 to N64) shown in FIG. 2A are arranged.

Figure 3:
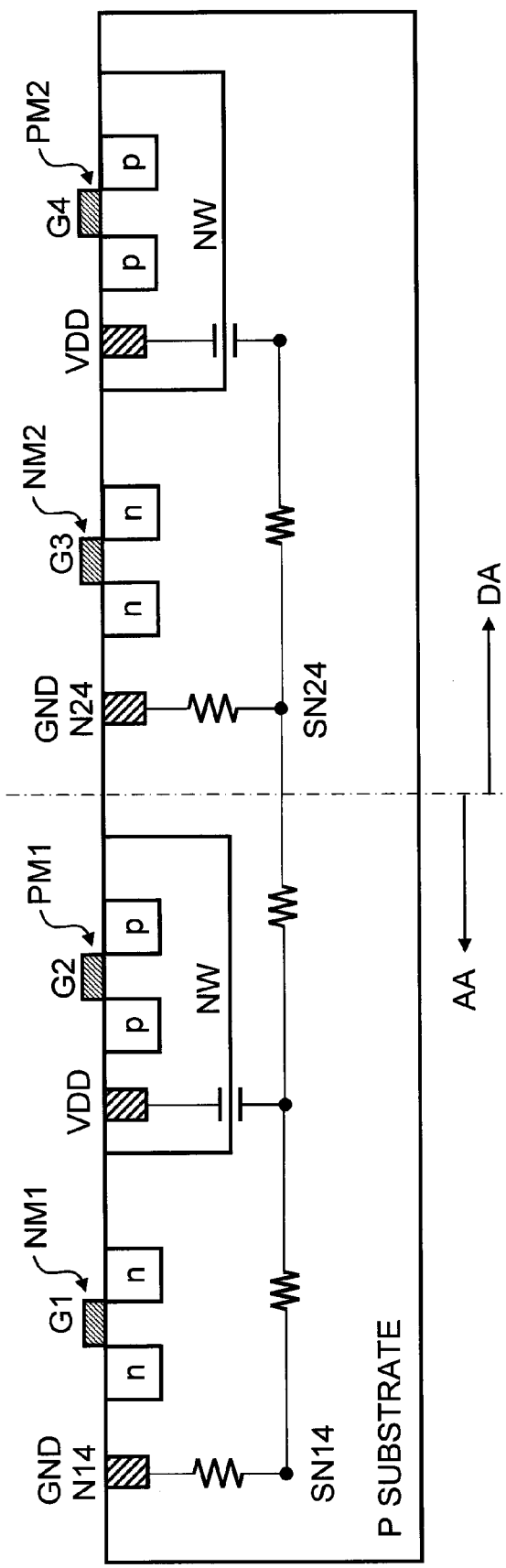
FIG. 3 is a schematic cross-sectional view showing the semiconductor device chip 101 taken along the line III-III of FIGS. 2A and 2B.

FIG. 3 is a schematic cross-sectional view showing the semiconductor device chip 101 taken along the line III-III of FIGS. 2A and 2B. The semiconductor device chip 101 is composed of a P substrate. In the analog circuit region AA, a CMOS transistor including an NMOS transistor NM1 and a PMOS transistor PM1 is formed. In the digital circuit region DA, a CMOS transistor including an NMOS transistor NM2 and a PMOS transistor PM2 is formed.

The NMOS transistor NM1 is composed of an n-type diffusion layer and a gate electrode G1 formed on the P substrate. The PMOS transistor PM1 is composed of a p-type diffusion layer and a gate electrode G2 formed on an N well NW of the P substrate. In a similar manner, the NMOS transistor NM2 is composed of an n-type diffusion layer and a gate electrode G3 formed on the P substrate. The PMOS transistor PM2 is composed of a p-type diffusion layer and a gate electrode G4 formed on an N well NW of the P substrate.

Here, in each of the analog circuit region AA and the digital circuit region DA, a ground tap for supplying a ground voltage GND to the P substrate is formed. Although a plurality of ground taps are formed actually, they are degenerated and illustrated as a single ground tap. The ground tap formed in the analog circuit region AA corresponds to the node N14 shown in FIG. 2A. The ground tap formed in the digital circuit region DA corresponds to the node N24 shown in FIG. 2A. In a similar manner, in each of the N well NW of the analog circuit region AA and the N well NW of the digital circuit region DA, a power tap for supplying a power voltage VDD is formed.

In the P substrate under the node N14, the virtual node SN14 of FIG. 2B is shown. In a similar manner, in the P substrate under the node N24, the virtual node SN24 of FIG. 2B is shown. As shown in FIG. 2A, the nodes N14 and N24 provided in wirings separately from each other are connected with each other through the substrate, which is a pathway of the substrate noise. Here, as shown in FIG. 3, the power wiring (power voltage VDD) and the ground wiring (ground voltage GND) are connected to each other through a capacitor of a PN junction. Therefore, in the substrate noise analysis by using the DC analysis, it is not necessary to consider the power wiring (power voltage VDD).

Figure 4:
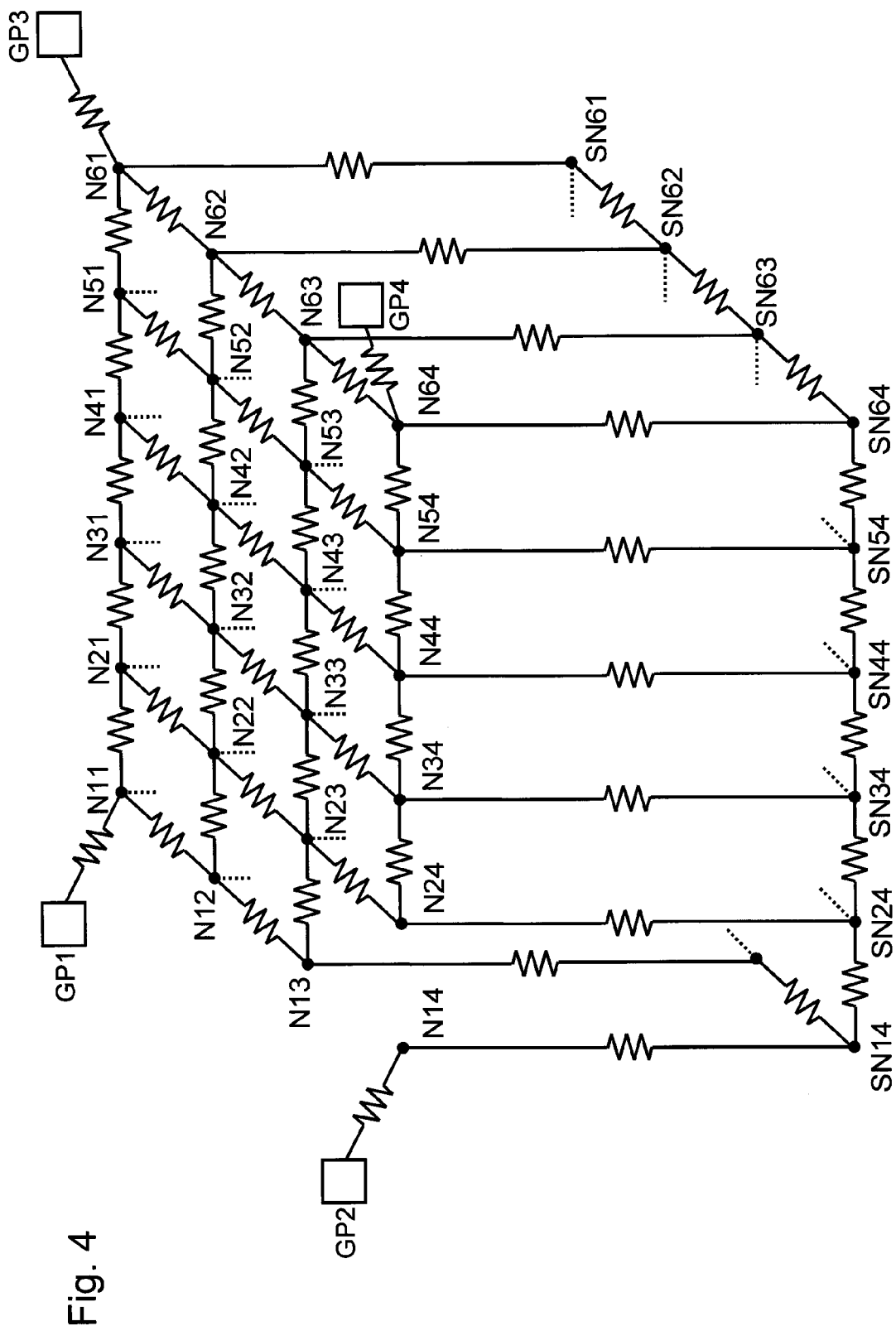
FIG. 4 is a perspective view showing an analysis model corresponding to the ground wiring network of FIG. 2A and the virtual wiring network of FIG. 2B.

FIG. 4 is a perspective view showing an analysis model corresponding to the ground wiring network of FIG. 2A and the virtual wiring network of FIG. 2B. As shown in FIG. 4, the analysis model has a cuboid shape. The upper surface corresponds to the analysis model of the ground wiring network shown in FIG. 2A. The lower surface corresponds to the analysis model of the virtual wiring network in the substrate shown in FIG. 2B. As shown in FIG. 4, each wiring between neighboring nodes (which is called a branch hereinafter) in the ground wiring network shown in FIG. 2A is modeled as an element resistor. In addition, each wiring between the ground pads GP1 to GP4 and their nearest neighboring nodes N11, N14, N61, and N64 is also modeled as an element resistor. The virtual wiring network in the substrate shown in FIG. 2B is modeled in a similar manner. Note that the analysis model of the virtual wiring network in the substrate is partially omitted, as is obvious from FIG. 4.

In the analysis model shown in FIG. 4, 24 nodes of the ground wiring network shown in FIG. 2A are connected to the corresponding 24 nodes of the virtual wiring network in the substrate shown in FIG. 2B through resistors, respectively. Specifically, as shown in FIG. 4, the node N14 of the ground wiring is connected to the corresponding virtual node SN14 of the virtual wiring in the substrate through a resistor. In a similar manner, the node N24 of the ground wiring is connected to the corresponding virtual node SN24 of the virtual wiring in the substrate through a resistor. Other nodes are connected in a similar manner, so the description thereof is omitted.

Next, step ST2 in FIG. 1 of setting the initial resistance value of the ground wiring network is described. Although the initial resistance value is not limited in particular, it is preferred to set a large value as the initial resistance value. Here, a resistance value can be changed depending on a wiring width, the number of wirings, a wiring thickness, or the like. However, it is preferred to change the wiring width in order to change the resistance value with less effect on the manufacturing process. In this case, the narrower width of the wiring indicates the larger resistance of the wiring. Thus, the finally obtained area of the ground wiring can be reduced by starting from the wiring having a width as small as possible. Next, step ST3 in FIG. 1 of performing the DC analysis is described. The DC analysis can be performed by using SPICE (Simulation Program with Integrated Circuit Emphasis) on a computer, for example. By the DC analysis, the voltage of each node of the ground wiring network shown in FIG. 2A and the voltage of each virtual node of the virtual wiring network in the substrate shown in FIG. 2B can be obtained.

Figure 5:
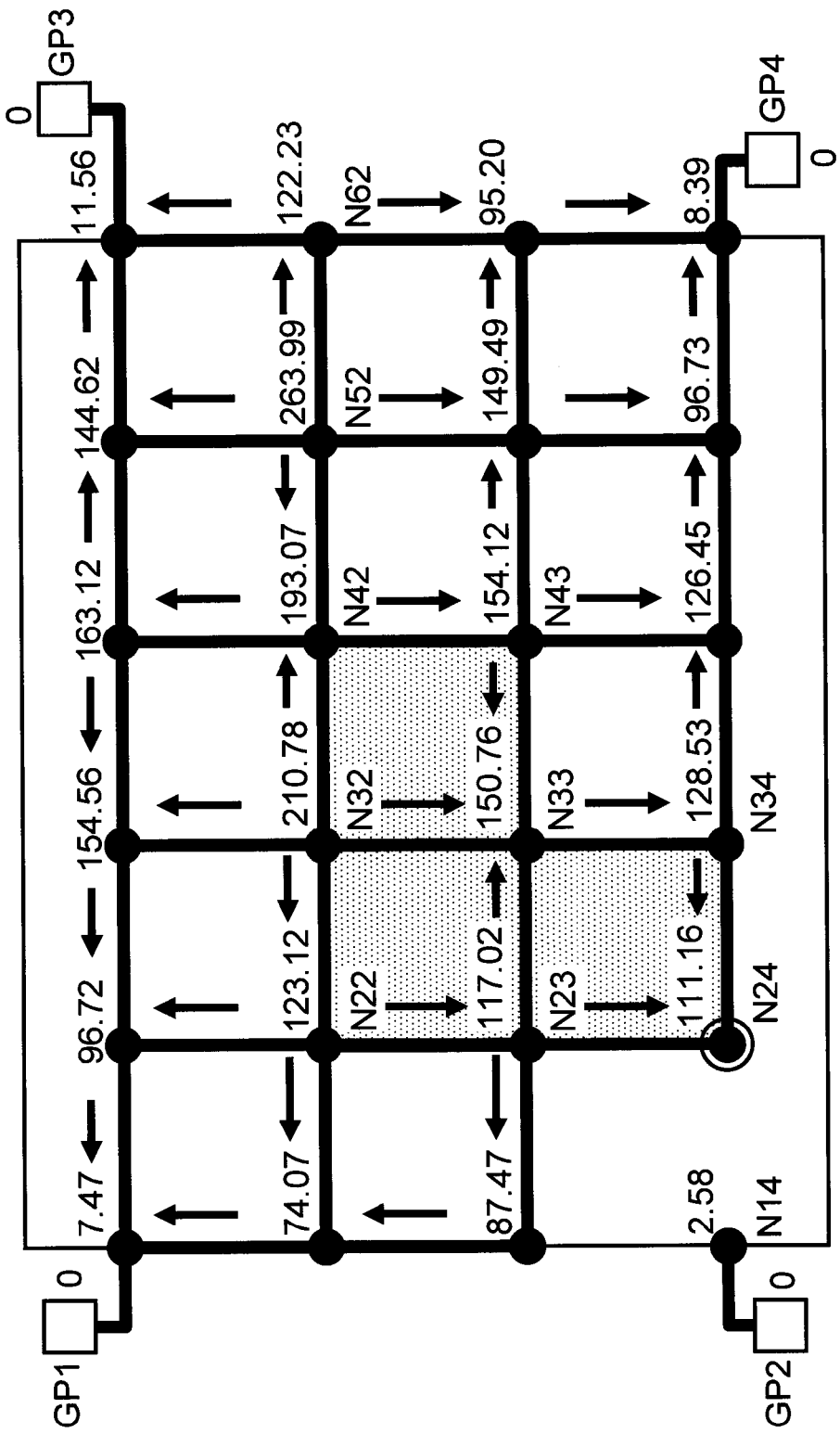
FIG. 5 is an example of voltage values at each node in the ground wiring network shown in FIG. 2A obtained by the DC analysis.

FIG. 5 is an example of voltage values at each node in the ground wiring network shown in FIG. 2A obtained by the DC analysis. In FIG. 5, all the voltages of the ground pads GP1 to GP4 are 0 V. A value shown near each node indicates the voltage (mV) at the node. Arrows extending along each branch indicate directions of currents. As a matter of course, a current flows from a node having a higher voltage to a node having a lower voltage between the neighboring nodes. In FIG. 5, symbols of nodes other than the nodes N14, N22 to N24, N32 to N34, N42, N43, N52, and N62 are omitted.

Figure 6:
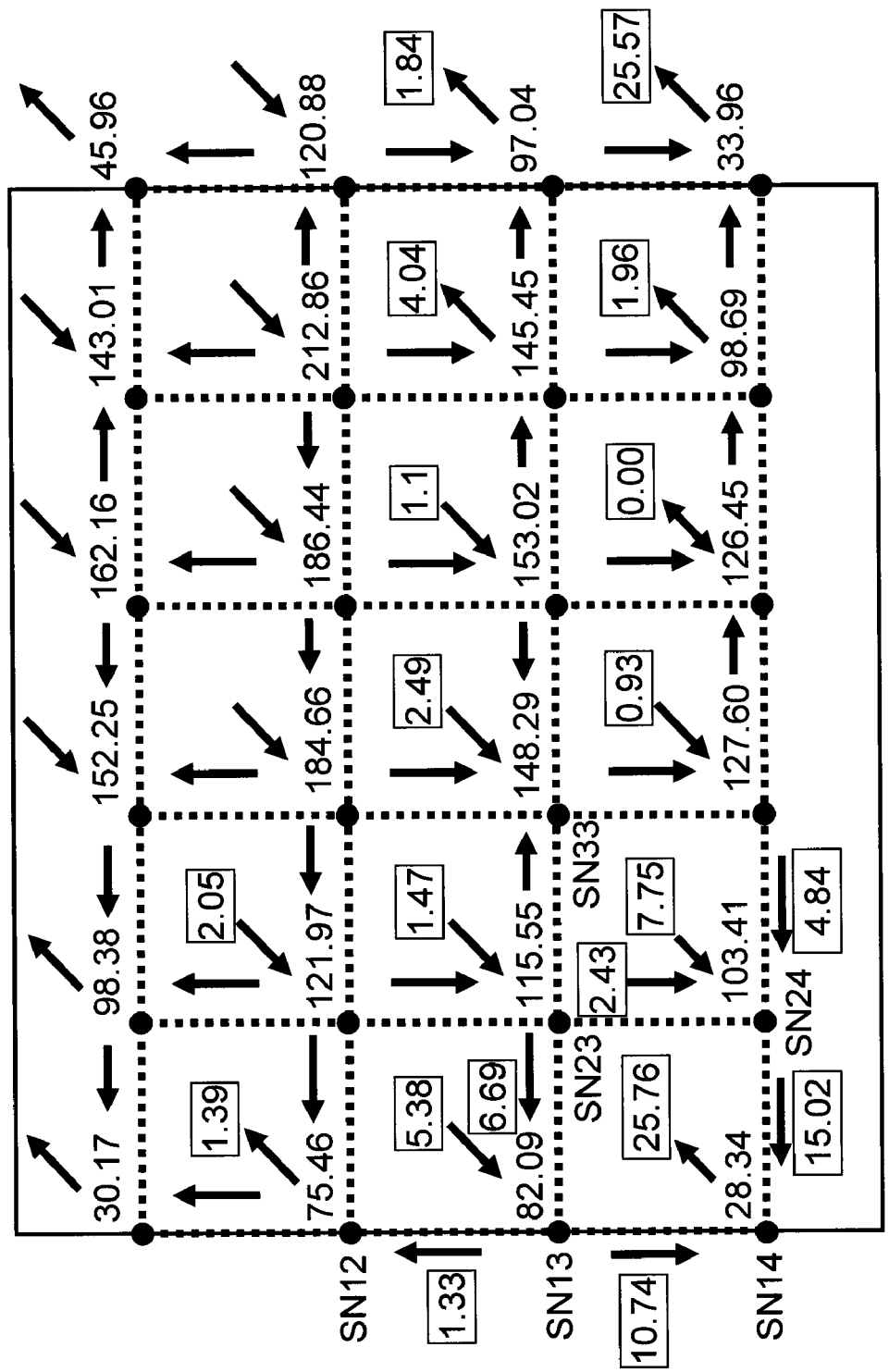
FIG. 6 is an example of voltage values at each virtual node in the virtual wiring network shown in FIG. 2B obtained by the DC analysis.

FIG. 6 is an example of voltage values at each node in the virtual wiring network in the substrate shown in FIG. 2B obtained by the DC analysis. In FIG. 6, a value shown near each virtual node indicates the voltage (mV) of the virtual node. Vertical or horizontal arrows extending along each branch indicate directions of currents. Oblique arrows directed to each virtual node indicate directions of currents flowing between each virtual node and the node of the ground wiring network corresponding to the virtual node. Further, boxed values attached to each oblique arrow indicate current values (mA). Note that symbols of virtual nodes other than the virtual nodes SN12, SN13, SN14, SN23, SN24, and SN33 are omitted in FIG. 6.

Next, step ST4 in FIG. 1 of determining whether substrate noise violation exists or not is described. As mentioned above, the substrate noise can be considered as the dynamic IR drop problem in the node N14 of the analog circuit. Therefore, it is possible to determine whether the IR drop violation exists or not in the node N14 shown in FIG. 5. Specifically, when the variation from the ground voltage (0 V) exceeds a certain standard value, the IR drop violation, or the substrate noise violation, is deemed to exist. Here, as shown in FIG. 1, when the substrate noise violation does not exist, the flow ends.

Next, step ST5 of searching a bottleneck branch and changing the resistance value of the bottleneck branch is described. As shown in FIG. 1, in step ST4, when the IR drop violation exists, a bottleneck branch is searched and the resistance value of the bottleneck branch is changed. Here, a method of searching a bottleneck branch is described with reference to FIGS. 5 and 6.

First, the node supplying the largest amount of current to the node N14 of the analog circuit (which is called a maximum current node hereinafter) is searched from 23 nodes (nodes N11 to 13, nodes N21 to 24, nodes N31 to N34, nodes N41 to N44, nodes N51 to N54, and nodes N61 to N64) of the ground wiring in the digital circuit. In short, the node is assumed to have the greatest influence on the IR drop violation of the node N14. As shown in FIG. 4, the current flows from each node of the ground wiring of the digital circuit to the node N14 of the analog circuit though the virtual wiring network in the substrate.

As mentioned above, in each virtual node shown in FIG. 6, current values (boxed values) are shown with the arrows indicating the directions of currents flowing between the virtual nodes and the corresponding nodes of the ground wiring. As shown in FIG. 6, a current of 25.76 mA flows into the node N14 of the analog circuit through the virtual node SN14. On the other hand, a current of 7.75 mA flows from the node N24 of the digital circuit into the corresponding virtual node SN24. In a similar manner, a current of 5.38 mA flows from the node N13 of the digital circuit into the corresponding virtual node SN13. A current of 1.47 mA flows from the node N23 of the digital circuit into the corresponding virtual node SN23. A current of 2.49 mA flows from the node N33 of the digital circuit into the corresponding virtual node SN33. The same holds true for other nodes as shown in FIG. 6, so the description thereof is omitted.

First, consider the node N24. As shown in the current path of FIG. 6, all the current of 7.75 mA flowing from the node N24 to the corresponding virtual node SN24 flows into the node N14 of the analog circuit.

Next, consider the node N13. As shown in the current path of FIG. 6, a current of 5.38 mA flowing from the node N13 to the corresponding virtual node SN13 branches into the virtual nodes SN12 and SN14. Here, as shown in FIG. 6, a current of 1.33 mA flows from the virtual node SN13 to the virtual node SN12. A current of 10.74 mA flows from the virtual node SN13 to the virtual node SN14. Thus, the amount of the current flowing from the node N13 into the node N14 of the analog circuit is represented by $5.38 \times 10.74/(10.74+1.33)$ =4.79 mA. Such a calculation is performed with respect to all the nodes of the digital circuit. As a result, in the example of FIGS. 5 and 6, the maximum current node is the node N24. In FIG. 5, the node N24 is circled.

Next, in the ground wiring network of FIG. 5, current paths for supplying a current to the maximum current node N24 are searched. The current paths can be searched by following the arrows in the reverse direction from the maximum current node N24. In the example of FIG. 5, the hatched region corresponds to the current paths to be searched. Here, in the ground wiring network shown in FIG. 5, the maximum value of the IR drop between the neighboring nodes is 141.76 mV between the nodes N52 (voltage=263.99 mV) and N62 (voltage=122.23 mV). However, the branch is not included in the hatched region. Therefore, if the resistance value of this branch is changed, the voltage value of the node N14 of the analog circuit cannot be decreased and the IR drop, or the substrate noise, cannot be resolved effectively.

As shown in FIG. 5, the number of current paths which lead to the maximum current node N24 is four. The four current paths include N24←N23←N22←N32, N24←N34←N33←N32, N24←N34←N33←N23←N22←N32, and N24←N34←N33←N43←N42←N32.

Here, for example, when the voltage difference between the neighboring nodes exceeds a bottleneck standard value, the branch is assumed to be defined as a bottleneck branch. Here, for example, the bottleneck standard is assumed to be 60 mV. In the case of FIG. 5, according to this definition, the branch with a voltage difference of 87.66 mV between the nodes N22 and N32 and the branch with a voltage difference of 60.02 mV between the nodes N32 and N33 fall into bottleneck branches. Therefore, the resistance values of these two bottleneck branches are changed. Specifically, the resistance values are decreased by widening the width of these two bottleneck branches. Here, without setting the standard value, the branch with a maximum voltage difference between the neighboring nodes (the branch between the nodes N22 and N32 in the case of FIG. 5) may be assumed as a bottleneck branch, and the resistance value of the branch may be changed. In short, at least a branch with a maximum voltage difference between the neighboring nodes may be selected as a bottleneck branch and the resistance value of this branch may be changed. Then, the flow returns to step ST3 and the DC analysis is performed again. Steps ST3 to ST5 are repeated until the IR drop violation does not exist in step ST4.

Second Embodiment

Next, a method for laying out a power wiring of a semiconductor device according to a second embodiment of the present invention is described hereinafter with reference to FIG. 7. In the first embodiment, a branch with a maximum voltage difference or a voltage difference exceeding the standard value between the neighboring nodes in the region shown in FIG. 5 is selected as a bottleneck branch. In the second embodiment, the most important current path (a critical path) is determined in view of the amount of current of each branch in the region shown in FIG. 5. Further, a branch with the maximum voltage difference between the neighboring nodes included in the critical path is selected as a bottleneck branch.

Figure 7:
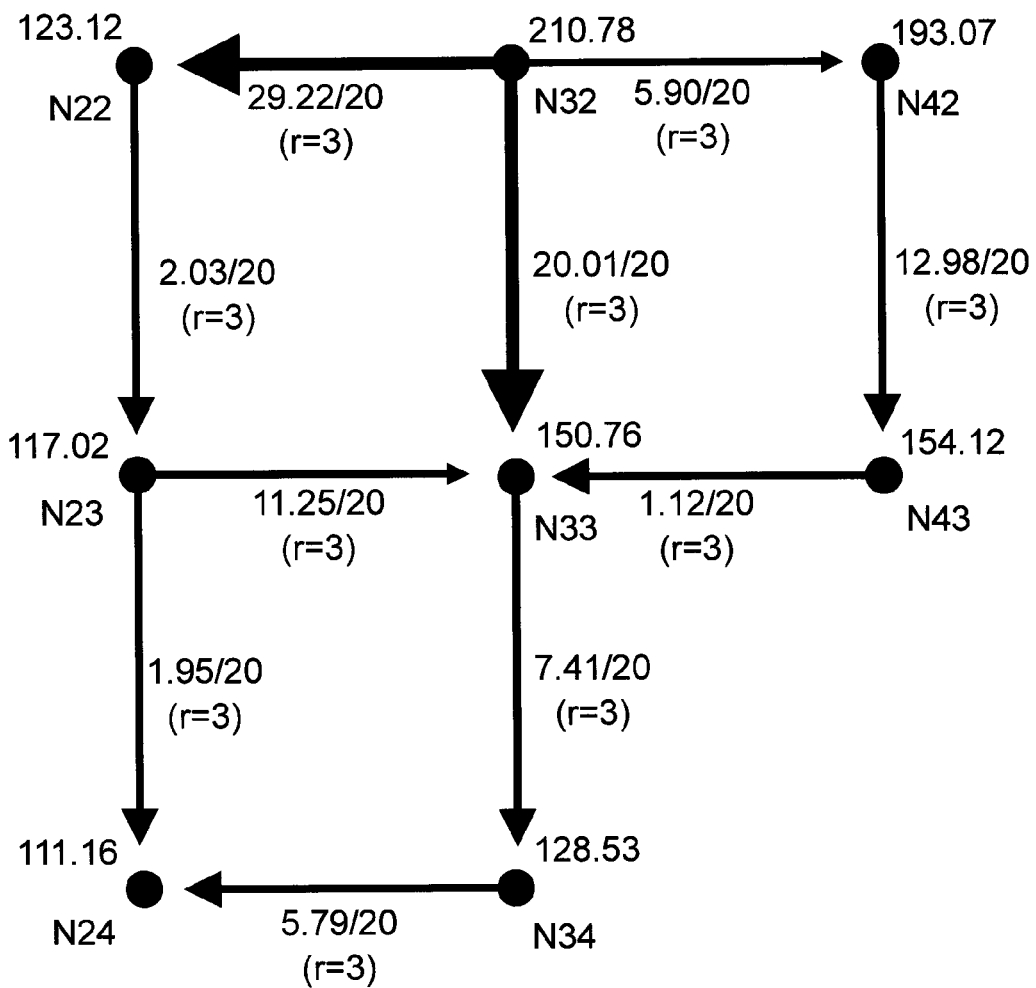
FIG. 7 is a diagram in which costs (=current/allowable current) are added to each branch of FIG. 5.

FIG. 7 is a diagram in which costs (=current I/allowable current Ia) are added to each branch of FIG. 5. A value r (unit: Ω) in parentheses represents the resistance value of each branch. The voltage values r are set appropriately. When the voltage difference between the neighboring nodes is set so as not to exceed the bottleneck standard value, an allowable current Ia can be expressed as Ia=Vbn/r by using the bottleneck standard Vbn and the resistance value r of each branch. On the other hand, the current I can be expressed as I=V/r, assuming that the voltage difference between the neighboring nodes is represented by V. Thus, cost=I/Ia=V/r/(Vbn/r)=V/Vbn.

In the example of FIG. 7, the bottleneck standard Vbn=60 mV and the resistance value of each branch r=3Ω. Therefore, the allowable current Ia of each branch is expressed as Ia=60 mV/3 Ω=20 mA. When the voltage difference between the nodes N24 and N23 is 5.86 mV (=117.02 mV−111.16 mV) as shown in FIG. 5, the current I is expressed as I=5.86 mV/3 Ω=1.95 mA. Therefore, cost=1.95/20. With regard to other branches, the cost is obtained in a similar manner.

As shown in FIG. 7, there are four current paths: N24←N23←N22←N32, N24←N34←N33←N32, N24←N34←N33←N23←N22←N32, and N24←N34←N33←N43←N42←N32. Inverse numbers of costs of each current path, or inverse ratios of the current I and the allowable current Ia (=Ia/I), are added up. Then, the path with the minimum value is selected as the critical path. In the example of FIG. 7, the path (N24←N34←N33←N32) is the critical path. Further, in the path (N24←N34←N33←N32), the branch with a maximum voltage difference of 60.02 mV between the nodes N32 and N33 is selected as a bottleneck branch.

Note that the starting point is the node N32 (210.78 mV) and the endpoint is the node N24 (111.16 mV) in all the above-mentioned four paths. Therefore, a sum of costs is the same value (210.78−111.16)/60=1.66 in all the above-mentioned four paths. Other steps are the same with those of the first embodiment, so the description thereof is omitted.

Third Embodiment

Figure 8:
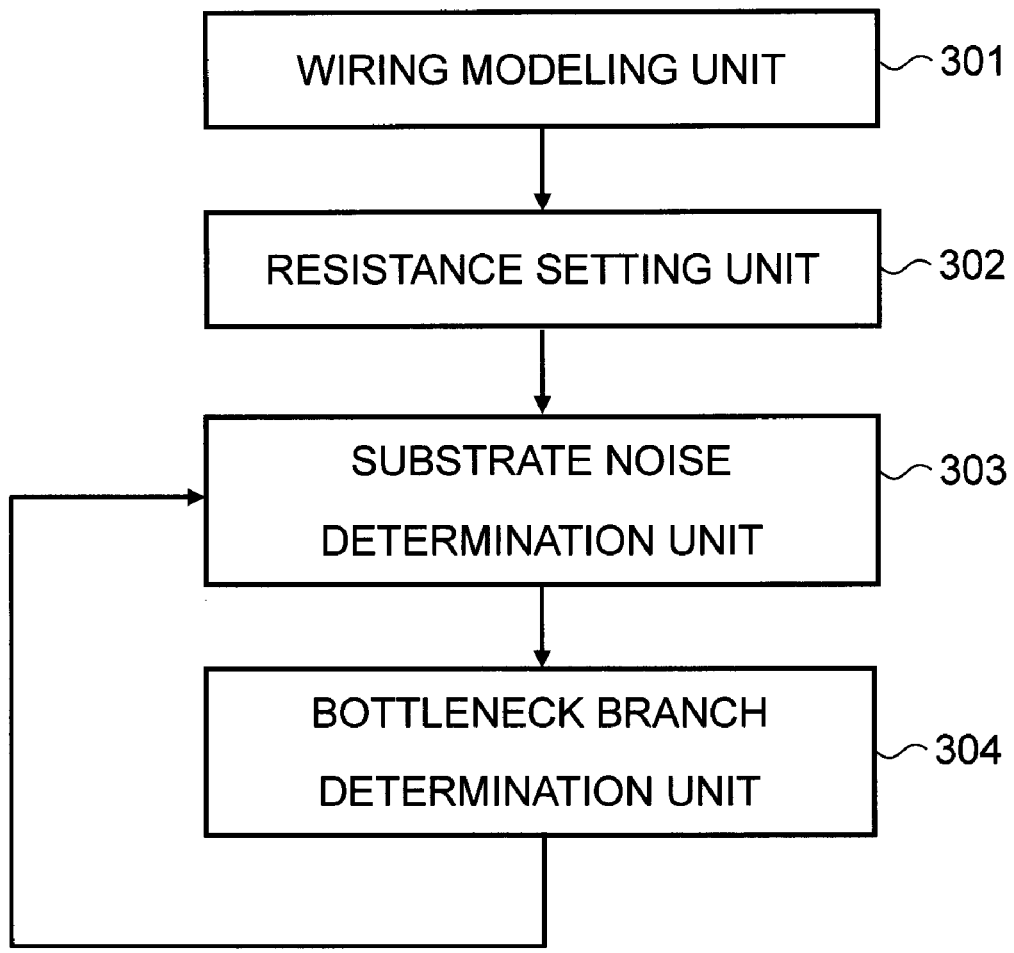
FIG. 8 is a block diagram showing an apparatus for laying out a power wiring for designing a semiconductor device according to a third embodiment of the present invention.

Next, an apparatus for laying out a power wiring of a semiconductor device according to a third embodiment of the present invention is described hereinafter with reference to FIG. 8. FIG. 8 is a block diagram showing the apparatus for laying out a power wiring of a semiconductor device according to the third embodiment of the present invention. The method for laying out a power wiring of a semiconductor device described above in the first and second embodiments is typically performed by being incorporated into software such as an integrated circuit design tool. However, as shown in FIG. 8, the method can also be put into practice by hardware.

As shown in FIG. 8, the apparatus for laying out a power wiring of a semiconductor device according to the third embodiment includes a wiring modeling unit 301, a resistance setting unit 302, a substrate noise determination unit 303, and a bottleneck branch determination unit 304. The wiring modeling unit 301 generates a power wiring model as shown in FIG. 4 based on design data of the ground wiring and the substrate as shown in FIGS. 2A and 2B. The substrate noise determination unit 303 determines whether the substrate noise exists or not by using the power wiring model generated by the wiring modeling unit 301. The specific method for determining the substrate noise is similar to that of the first embodiment. The bottleneck branch determination unit 304 determines a bottleneck branch having a large influence on the substrate noise based on the substrate noise determination result, and changes the resistance value of the bottleneck branch. The specific search method is similar to that of the first embodiment.

Although the present invention has been described with reference to the embodiments, the present invention is not limited to the above embodiments. Various modifications that can be understood by a person in the art within the scope of the present invention can be made to the configuration and details of the present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A method for laying out a power wiring of a semiconductor device comprising an analog circuit and a digital circuit, the method comprising:
    modeling the power wiring as an analysis model comprising a plurality of nodes and a plurality of element resistors provided between the plurality of nodes neighboring each other;
    obtaining voltage values of the plurality of nodes by a circuit simulation;
    searching a maximum current node from nodes of the digital circuit when a substrate noise violation exists in a voltage value of a node of the analog circuit, the maximum current node having a maximum amount of current flowing into the node of the analog circuit;
    searching a path of a current flowing into the maximum current node in the digital circuit;
    selecting a bottleneck element resistor from among the plurality of element resistors included in the path; and
    changing a resistance value of the bottleneck element resistor.

2. The method according to claim 1, wherein in the searching of the path, all paths of currents flowing into the maximum current node are searched.

3. The method according to claim 1, wherein the bottleneck element resistor comprises an element resistor having a maximum voltage difference between both end nodes in the path.

4. The method according to claim 1, wherein
    inverse ratios of a current and an allowable current of each of the plurality of element resistors included in the path are obtained, and
    the bottleneck element resistor is selected in a critical path that is a path of a current having a minimum sum of the inverse ratios.

5. The method according to claim 4, wherein the bottleneck element resistor comprises an element resistor having a maximum voltage difference between both end nodes in the critical path.

6. The method according to claim 1, wherein the circuit simulation is performed again after changing the resistance value of the bottleneck element resistor.

7. The method according to claim 1, wherein the resistance value of the bottleneck element resistor is changed from a larger value to a smaller value.

8. The method according to claim 1, wherein the resistance value of the bottleneck element resistor is changed by widening a width of the bottleneck element resistor.

9. An apparatus for laying out a power wiring of a semiconductor device comprising an analog circuit and a digital circuit, the apparatus comprising:
    a power wiring modeling unit that models the power wiring as an analysis model comprising a plurality of nodes and a plurality of element resistors provided between the plurality of nodes neighboring each other;
    a substrate noise determination unit that obtains voltage values of the plurality of nodes and determines whether a substrate noise violation exists or not in a voltage value of a node of the analog circuit; and
    a bottleneck determination unit that searches, from nodes of the digital circuit, a maximum current node having a maximum amount of current flowing into the node of the analog circuit, determines a bottleneck element resistor from the plurality of element resistors included in a path of a current flowing into the maximum current node, and changes a resistance value of the bottleneck element resistor.

* * * * *